United States Patent Office 3,112,441
Patented Nov. 26, 1963

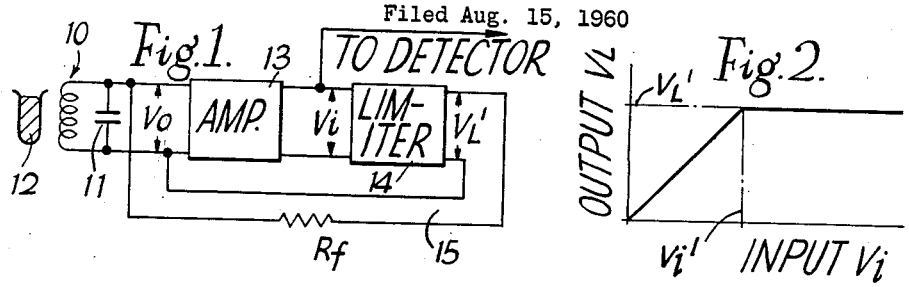
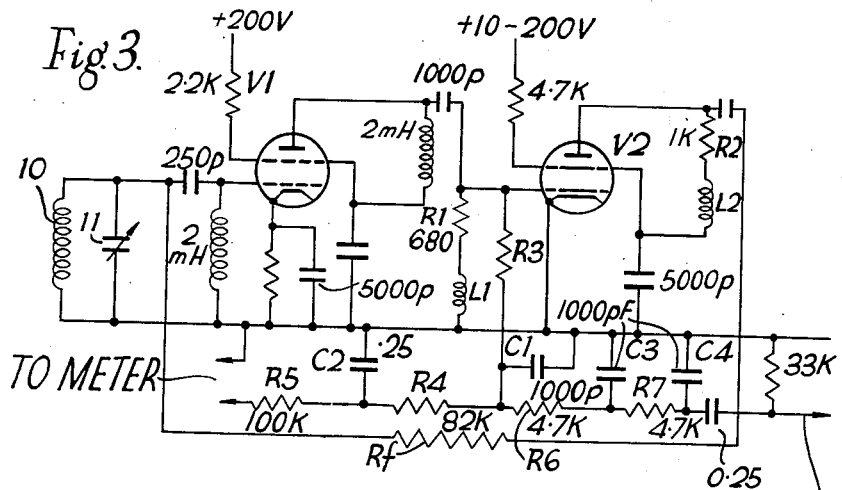
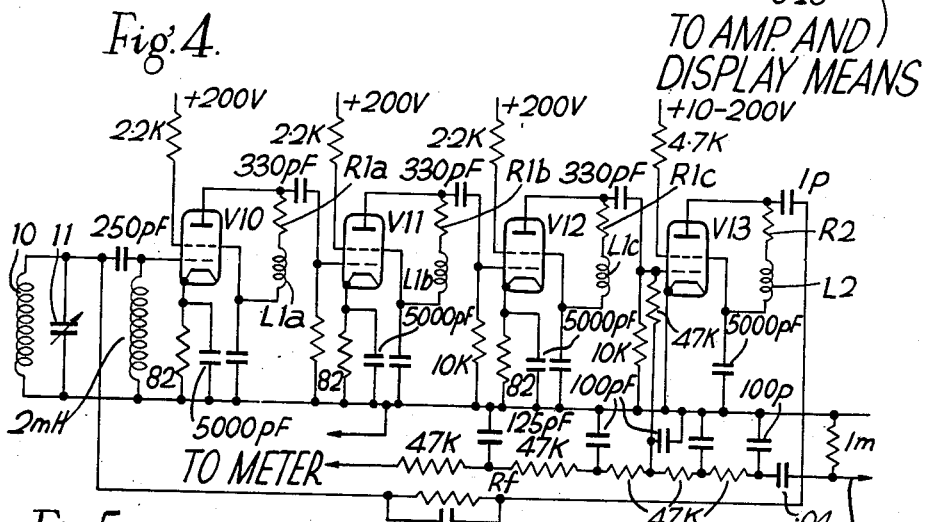
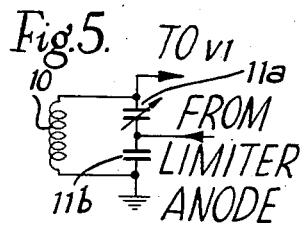
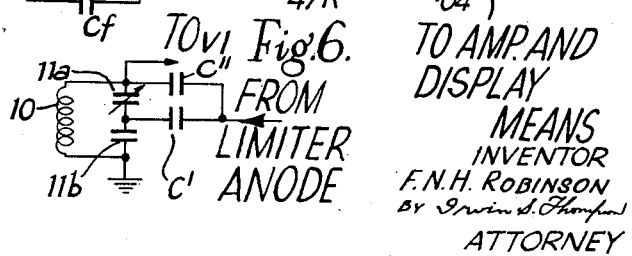

3,112,441
NUCLEAR RESONANCE ABSORPTION
APPARATUS
Frank Neville Hosband Robinson, The Thatched Cottage,
Iffley, Oxford, England
Filed Aug. 15, 1960, Ser. No. 49,554
Claims priority, application Great Britain Aug. 18, 1959
22 Claims. (Cl. 324—.5)

This invention relates to nuclear resonance detecting apparatus and is more particularly concerned with improved circuit arrangements for enabling detection of the power absorption from an oscillation magnetic field $H_1$ disposed at right angles to a uniform uni-directional field $H_0$ when material containing nuclei precessing at a frequency equal or nearly equal to the frequency $f$ of the oscillating magnetic field is present within both of said magnetic fields.

A number of nuclear resonance absorption arrangements are already known including those in which the oscillating field $H_1$ is produced by alternating current in a coil winding of inductance L and resistance R, the effect of nuclear resonance absorption being an apparent increase in the resistance R. If the said coil winding forms part of a tuned circuit such increase of resistance effectively produces a change in the quality factor or Q value of the circuit, Q being equal to $$\frac{2\pi fL}{R}$$

where $f$ is the natural resonance frequency of the coil winding and L is its inductance.

It can be shown that nuclear resonance absorption produces a change in 1/Q given by:

$$1/Q \rightarrow 1/Q + \delta\left(\frac{1}{Q}\right)$$

where $\delta(1/Q) = 4\pi y X''$, wherein $y$ is a geometric factor depending upon how much of the coil is filled by the nuclei and $X''$ is a quantity characterising the nuclei, their number per unit volume and the strength of their coupling to the oscillating field. The value of $X''$ varies over several orders of magnitude for different materials, being highest for protons in liquids, e.g. water, and lowest for nuclei with small magnetic moments in solids. $X''$ also depends upon the strength of the steady magnetic field H (and thus upon the frequency of the oscillating field) and decreases rapidly if the strength of the oscillating field is too high.

The strength of the oscillating field depends upon the voltage across the tuned circuit. In the study of proton nuclear resonance in water containing paramagnetic impurities, such as copper sulphate, the optimum voltage level across the tuned circuit, i.e. the highest level at which $X''$ maintains its full value, may be of the order of 1 volt whereas in the study of the $Li^7$ resonance in solid lithium fluoride, the optimum voltage level may be of the order of only 1 millivolt. Thus, depending upon the nuclei and the material containing them, there is an optimum range of coil voltage. The basic problem in nuclear resonance detection is therefore to measure a small change in the Q factor of a coil winding without applying more than a predetermined voltage across it.

In one known arrangement, basically due to Rollin, the said tuned coil winding is supplied by way of a high series resistance circuit from a separate oscillator of frequency $f$ to develop a voltage $V_0$ across the coil without the nuclei being present and then to measure or observe any changes of this voltage when the nuclei are present, as by means of a suitable detector connected directly across the coil. The resultant, small, change of voltage $\delta V$ can be shown to be equal to $-Q\delta(1/Q)V_0$, and this must be compared with the noise voltages present to discover what is the smallest detectable change. It can be shown that the ultimate theoretical limit is $$\delta(1/Q) = \frac{1}{V_0}\left(\frac{4kTB}{Q2\pi fC}\right)^{1/2}$$

where $k$ is Boltzmann's constant, T is the temperature of the coil winding and B the bandwidth of reception in the detector. It will be seen that the minimum detectable change $\delta(1/Q)$ becomes smaller as $V_0$ is increased but, as already stated, the maximum permissible value of $V_0$ is determined by the properties of the nuclei-containing specimen.

Such circuits using a separate oscillator suffer from practical disadvantages. Firstly, it is necessary to tune both the oscillator and the actual nuclear resonance circuit very accurately to the same frequency. This involves two separate controls and renders the arrangement difficult and tedious to use. Secondly, the arrangement is extremely prone to microphonic noise generation due to small changes in the parameters, especially the capacitance, of the tuned nuclear resonance circuit due to vibration. This results in difficulty in the mechanical design and construction of the coil and its leads in order to reduce the generated noise voltages to a tolerable level.

Except for certain fundamental physical investigations, such separate oscillator type circuit arrangements are becoming little used. For most applications, such as magnetic field meters, measurement of chemical shifts and searching for resonance lines of unknown frequency, the so-called marginal oscillator type of circuit is employed. In this type of circuit arrangement the coil winding for producing the oscillating magnetic field provides the inductive element of the tank circuit of the oscillator itself. The frequency of oscillation is therefore determined by the nuclear resonance circuit and the previously mentioned disadvantages of oscillator tracking and microphonics are avoided.

Although less sensitive than the Rollin circuit, such marginal oscillator circuits are convenient in use, are widely used and are particularly adapted for employment in proton field measuring devices for measuring the strength of an unknown static field H from the frequency $f$ at which nuclear resonance absorption occurs with a known material sample.

The known marginal oscillator arrangements however have certain disadvantages including:

(1) The level of oscillation is dependent upon the curvature of the oscillator valve characteristic. This is small, unpredictable and difficult to control. While it is comparatively simple to obtain oscillation at levels between 0.02 volt and 1.0 volt, it is difficult to obtain stable oscillations at lower levels without resorting to elaborate feedback control systems. The oscillation level is determined by the ratio of the difference between two large quantities (the circuit loss and the valve gain) to a small quantity (the curvature of the valve gain characteristic). As a result, the level of oscillation will change greatly as the resonance frequency of the oscillator is altered with the accompanying changes in its loss value.

(2) The output signal obtained from the detector does not have a simple relationship to the nuclear resonance absorption. Any observed change of the oscillation level is as much due to changes in the oscillator valve behaviour as to changes in the actual absorption. As a result, this type of circuit arrangement does not lend itself readily to use in nuclear resonance absorption in which more information is being sought than just the frequency at which absorption occurs.

(3) The sensitivity being, at most, only one half that of the Rollin's type circuit, weak absorption lines become even more difficult to detect.

(4) The amount of feedback which can be employed is limited, particularly when a low oscillation level is required. Experiments which require the use of rather lossy circuits at low oscillation level may be impossible because stable oscillation cannot be maintained.

Objects of the present invention include the provision of circuit arrangements in which some or all of the above enumerated disadvantages are materially reduced or even eliminated.

In such known forms of marginal oscillator circuit one and the same valve is employed to produce regeneration and to limit the amplitude of the oscillation to a stable value. When the oscillation level is low, this requires the use of a valve having both a very curved characteristic and an adequate gain, qualities which are not usually compatible.

Broadly in accordance with the invention the two functions of amplification and limiting are separated by providing separate amplifier and limiting elements. The amplifier may then be arranged to provide more than enough gain to afford adequate regeneration while the limiter may be placed at a position in the circuit where the oscillation level is high and effective limiting readily achieved.

In order that the above and other objects and features of the invention may be more readily understood, embodiments of the invention will now be described in some detail and with reference to the accompanying drawing wherein:

FIGURE 1 is a block schematic diagram of one arrangement according to the invention.

FIGURE 2 is a graphical diagram of the input/output characteristic of an idealised form of limiter device.

FIGURE 3 is a detailed circuit diagram of one embodiment of the invention.

FIGURE 4 is a detailed circuit diagram, similar to FIG. 3, of another embodiment of the invention suitable for use at lower oscillation amplitude levels than those of FIG. 3 while FIGURES 5 and 6 are fragmentary circuit diagrams illustrating possible modifications of the previous embodiments.

Reference is first made to FIG. 1 of the accompanying drawing which shows one circuit arrangement according to the invention in block schematic form. In this arrangement the nuclear resonance coil winding 10, shunted by capacitance 11, is connected across the input terminals of an amplifier 13 having voltage gain A. Reference 12 indicates the test sample of nuclei-containing material. The amplifier output terminals are connected to the input terminals of a separate limiter device 14 and the output terminals of the latter connected back to the input to amplifier 13 by way of a feedback circuit 15 including resistance $Rf$ and providing a feedback factor $\alpha$. The limiter device 14 ideally has an input/output characteristic of the form shown in FIG. 2.

In such arrangement, provided there is sufficient loop gain to start oscillation, this will build up to a level where the output voltage $V_L$ from the limiter 14 reaches the value $V_L = V_L^1$, where the voltage $V_0$ across the nuclear resonance coil 10 has the value $V_0 = \alpha V_L^1$, where the input voltage $V_i$ to the limiter 14 has the value $= AV_0 = A\alpha V_L^1$. This condition will arise provided $A\alpha V_L^1 > V_i^1$, where $V_i^1$ is the limiter input value at which limiting action starts.

The feedback factor $\alpha$ is given by $$\alpha = \frac{Z}{Rf+Z}$$

where Z is the impedance of the tuned circuit 10, 11 at resonance.

$$Z = Q2\pi fL = \frac{Q}{2\pi fC}$$

If $Rf \gg Z$, then $$\alpha = \frac{Z}{Rf} = \frac{Q}{2\pi fCRf}$$

The voltage $V_i$ available at the output from the amplifier 13 for application to a suitable detector is $$V_i = AV_0 = A\alpha V_L^1 = \frac{AV_L^1}{2\pi fCRf}Q$$

Since A, $V_L^1$, $2\pi f$, C and $Rf$ are all constants determined by the component values, the signal voltage is proportional to Q. The sensitivity of the arrangement is thus equal to that of the Rollin circuit.

The response characteristic of the limiter 14 is quite uncritical and provided it satisfies the expression $$\frac{V_i}{V_L} = \frac{\delta V_L}{\delta V_i} < \frac{1}{4}$$

the circuit behaviour is as already described. That is to say, the differential increase in the output of the limiter for a small increase in the limiter input must be less than ¼ of the actual gain $V_L/V_i$.

The level of oscillation $V_0$ across the resonance coil 10 is determined by two factors. Thus if the limiter 14 requires an input voltage of at least $V_i^1$ to operate satisfactorily, then the lowest level of oscillation $V_0$ is given by $$\frac{V_i^1}{A}$$

The oscillation level $V_0$ is also given by $$V_L^1 \frac{Z}{Rf}$$

The requirements for low level operation are therefore, high amplifier gain and low value of feedback. As an example, if the lowest permissible value of input voltage $V_i$ to the limiter 14 is taken at a practical value of, say, 0.25 volt, an oscillation level $V_0$ of 0.00025 volt may be obtained by providing an amplifier gain A of at least 1000. The signal available to the detector is, however, at the high level of the amplifier output $V_i$ and in consequence is simply (linearly) related to the nuclear resonance absorption. Low level operation at the resonance coil 10 is readily achieved by ensuring the amplifier 13 has sufficient gain, the limiter 14 providing automatic compensation for small changes in the overall gain.

FIG. 3 shows one simple form of circuit arrangement suitable for operation at oscillation levels of between 0.025 volt and 0.25 volt. In this circuit, V1 is the amplifier valve (type E180F) having an output load consisting of resistance R1 (680 ohms) in series with inductance L1 (2 microhenries). These two components also form the grid leak of a conventional pentode limiter circuit comprising valve V2 (type EF95). The anode load of the limiter valve V2 is the resistance R2 (1 kilo-ohm) in series with inductance L2 (4 microhenries) and feedback is by way of resistor $Rf$ which may have a value of between 22 kilo-ohms and 100 kilo-ohms depending upon the inductance L of the nuclear resonance coil winding 10. Simple variation of the HT voltage applied to the limiter valve V2 over the range of from about +10 volts to +200 volts permits alteration of the oscillation level $V_0$ from about 0.025 volt to 0.25 volt. The gain of the stage comprising valve V1 is of the order of 10 and the limiter input voltage $V_i$ is therefore variable between 0.25 volt and 2.5 volts.

The limiter valve V2 in the arrangement of FIG. 3 serves also as a detector. The output of the first valve V1 is rectified at the limiter valve control grid and may be applied, after filtering by network of resistors R3, R4, R5 and capacitor C1, C2 to operate a meter for monitoring the oscillation level and/or to drive a suitable display e.g. an oscilloscope, or other means, after filtering in a further network of resistors R6, R7 and capacitors C3, C4. Further amplification may, obviously, be provided as required in the display or other drive circuit.

The arrangement of FIG. 3 is satisfactory for operation at frequencies in the range 1–25 mc./s. and is particularly adapted for use as a proton magnetic field meter covering a range of between 250 and 6250 gauss when employing as nuclei copper sulphate in water or an extended range of up to 16,000 gauss by using other nuclei, such as Li$^7$ in a lithium acetate solution. Further extension of the measuring range up to 20,000 gauss may be effected by suitable modification of the circuit parameters to increase the operating frequency to 32 mc./s.

FIG. 4 shows another circuit arrangement according to the invention employing a three-stage amplifier of valves V10, V11, V12 (each type E180F) and a limiter valve V13 (type EF95). The arrangements are broadly similar to those of FIG. 3 and similar references indicate similar parts. The anode load of resistors R1a, R1b (560 ohms) and R1c (1 kilo-ohm) with their respective inductances L1a, L1b and L1c are arranged to tune, with stray capacity, at 28 mc./s. This makes it possible to operate the arrangement within the frequency range of 0.2 to 20 mc./s. The feedback capacity Cf across the feedback resistor Rf is a small, e.g. stray, capacity intentionally introduced into the wiring and operates to keep the phase shift of the feedback loop within acceptable limits at the upper frequency end of the range. The overall amplifier gain value A is increased to 1400 whereby an oscillation level $V_0$ of the order of 0.0002 volt or even less becomes practicable. The upper limit of the range of oscillation level, $V_0$ is set by the point of overloading in valve V12 at about 5 millivolts. Such upper limit can be raised to 250 millivolts by removing the cathode bypass capacitors of, first valve V12, then valve V11 also and finally valve V10 as well.

Various modifications are clearly possible without departing from the scope of the invention. For example, other forms of limiter circuits, such as diode limiter circuits, may be used and a variety of different feedback arrangements employed. FIG. 5 shows one alternative form of feedback connection where the connection from the anode of the limiter valve is connected to the junction point of a serially arranged variable capacitor 11a and fixed capacitor 11b shunted across the resonant coil winding 10, the variable tuning capacitor 11a being at the high potential end of the winding. This modified circuit provides a degree of feedback which decreases with increasing frequency of oscillation, in contrast to the increased degree of feedback with increasing frequency afforded by the arrangements of FIGS. 1, 3 and 4. A further alternative which combines both of the previous forms in order to provide a substantially flat feedback/frequency characteristic is shown in FIG. 6. In this modification the connection from the anode of the limiter valve is connected by way of a fixed capacitor C' to the junction point of a serially arranged variable tuning capacitor 11a and a fixed capacitor 11b and also by way of a second fixed capacitor C" to the high potential end of the resonant circuit. This last form of feedback circuit is particularly suitable for use with frequency modulation methods of examination instead of field modulation methods.

I claim:

1. Nuclear resonant absorption apparatus comprising a first electron discharge tube having at least one grid electrode, a cathode and an anode, an anode load circuit for said first electron discharge tube, an inductive coil winding for receiving a test sample of nuclei-containing material therein, a tuning capacitance in shunt across said winding to form a resonant radio frequency tank circuit, said tank circuit being connected across said grid electrode and cathode of said first discharge tube, a second electron discharge tube having at least one grid electrode, a cathode and an anode, an anode load circuit for said second discharge tube and means for causing operation of said tube as a limiter device to provide a substantially constant amplitude radio frequency output oscillation at said anode for any amplitude of input radio frequency oscillation applied across the grid and cathode electrodes of said second discharge tube which is in excess of a predetermined amplitude, circuit means coupling the anode and cathode of said first discharge tube to said grid electrode and cathode respectively of said second discharge tube and a regenerative feedback connection between the anode of said second discharge tube and said grid electrode of said first discharge tube to apply to said grid electrode of said first discharge tube a radio frequency oscillation of a constant amplitude such that the resultant oscillation across the anode and cathode of said first discharge tube is in excess of said predetermined amplitude.

2. Nuclear resonance absorption apparatus according to claim 1 in which said feedback connection includes a series resistance.

3. Nuclear resonance absorption apparatus according to claim 2 which includes a connection through a series resistor to an indicating meter.

4. Nuclear resonance absorption apparatus according to claim 3 which includes a further connection through said series resistor to amplifier and display means.

5. Nuclear resonance absorption apparatus according to claim 3 in which said anode load circuits of each of said first and second discharge tubes comprise series connected resistance and inductance.

6. In apparatus for detecting magnetic resonance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feed back circuit connecting said limiter output terminals to said resonant tank circuit to apply a constant amplitude radio frequency oscillation from said limiter output terminals to said resonant tank circuit.

7. In apparatus for detecting magnetic resonance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals, a regenerative feedback circuit connecting said limiter output terminals to said resonant tank circuit to apply a constant amplitude radio frequency oscillation from said limiter output terminals to said resonant tank circuit and a detector of amplitude variations of said radio frequency oscillation connected to said amplifier output terminals.

8. In apparatus for detecting magnetic responance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means comprising a multi-grid electron discharge tube and having input and output terminals for providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuits.

9. Nuclear absorption apparatus comprising an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means comprising a multi-grid electron discharge tube and having input and output terminals for providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit, and a detector of amplitude variations of said radio frequency oscillation connected to said amplifier output terminals.

10. In apparatus for detecting magnetic resonance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means having input and output terminals and an electron discharge tube having a grid electrode connected to one of said input terminals for providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuits and a detector of amplitude variations of said radio frequency oscillation connected to said grid electrode of said electron discharge tube of said limiter means.

11. Nuclear resonance absorption apparatus comprising an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means including a diode element and having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit.

12. In apparatus for detecting magnetic resonance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means including a diode element and input and output terminals for providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit and a detector of amplitude variations of said radio frequency oscillation connected to said amplifier output terminals.

13. In apparatus for detecting magnetic resonance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit including series-connected resistance connecting said limiter output terminals to said resonant tank circuit to apply a limited degree of feedback of said constant amplitude radio frequency oscillation from said limiter output terminals to said resonant tank circuit.

14. In apparatus for detecting magnetic resonance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit, said feedback circuit including series-connected resistance for limiting the degree of feedback and capacitance in shunt with said series-connected resistance for restricting the degree of phase shift of the feedback voltage with change of oscillation frequency.

15. In apparatus for detecting magnetic resonance phenomena, an inductive coil winding for providing a radio frequency oscillating field in a sample of nuclear resonant material, said coil winding forming part of the resonant tank circuit of a radio frequency oscillation generator comprising radio frequency amplifier means having input and output terminals, limiter means having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit, a detector of amplitude variations of said radio frequency oscillation connected to said amplifier output terminals and visual signal display means also connected to said amplifier output terminals.

16. In apparatus for detecting magnetic resonance phenomena, an inductive coil winding for providing a radio frequency oscillating field in a sample of nuclear resonant material, said coil winding forming part of a variable frequency resonant tank circuit of a radio frequency oscillation generator comprising radio frequency amplifier means having input and output terminals, limiter means having input and output terminals and an overall gain value of not less than 1000 at the maximum oscillation frequency of said tank circuit and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a fractional part of said constant amplitude radio frequency oscillation from said limiter output terminals to said resonant tank circuit.

17. In apparatus for detecting magnetic resonance phenomena, an inductive coil winding for providing a radio frequency oscillating field in a sample of nuclear resonant material, said coil winding forming part of a variable frequency resonant tank circuit of a radio frequency oscillation generator comprising radio frequency amplifier means having input and output terminals, limiter means having input and output terminals and an overall gain value of not less than 1000 at the maximum oscillation frequency of said tank circuit and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a fractional part of said constant amplitude radio frequency oscillation from said limiter output terminals to said resonant tank circuit, and an amplitude detector circuit connected to said amplifier output terminals.

18. In apparatus for observing magnetic resonance phenomena, means for providing a radio frequency oscillating field in a sample of material under test, said means comprising a coil winding forming part of the resonant tank circuit of a radio frequency oscillation generator which comprises radio frequency amplifier means having input and output terminals, limiter means having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit.

19. Apparatus for observing magnetic resonance phenomena which comprises means for providing a radio frequency oscillating field in a sample of material under test, said means including a coil winding forming part of the resonant tank circuit of a radio frequency oscillation generator comprising radio frequency amplifier means having input and output terminals, limiter means having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limited output terminals to said resonant tank circuit, and a detector of amplitude variations of said radio frequency oscillation connected to said amplifier output terminals.

20. Apparatus for observing magnetic resonance phenomena which comprises means for providing a radio frequency oscillating field in a sample of material under test, said means including a coil winding forming part of the resonant tank circuit of a radio frequency oscillation generator comprising radio frequency amplifier means having input and output terminals, limiter means having input and output terminals and an electron discharge tube having a grid electrode connected to one of said input terminals for providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit.

21. Apparatus for observing magnetic resonance phenomena which comprises means for providing a radio frequency oscillating field in a sample of material under test, said means including a coil winding forming part of the resonant tank circuit of a radio frequency oscillation generator comprising radio frequency amplifier means having input and output terminals, limiter means including a diode element and having input and output terminals and providing a substantially constant amplitude radio frequency output oscillation at its output terminals for any amplitude of input radio frequency oscillation in excess of a predetermined amplitude applied to its input terminals, circuit means connecting said resonant tank circuit to said amplifier input terminals, further circuit means connecting said amplifier output terminals to said limiter input terminals and a regenerative feedback circuit connecting said limiter output terminals to said resonant tank circuit to apply a constant amplitude radio frequency oscillation from said limiter output terminals to said resonant tank circuit.

22. In apparatus for detecting magnetic resonance phenomena, an inductive coil winding for providing a radio frequency oscillating field in a sample of material under test, said coil winding forming part of the resonant tank circuit of a radio frequency oscillation generator comprising radio frequency amplifier and limiter means providing a substantially constant amplitude radio frequency output oscillation for any amplitude of input radio frequency oscillation thereto which is in excess of a predetermined amplitude and a regenerative feedback circuit including alternator means between output of said amplifier/limiter means and said resonant tank circuit to apply a constant amplitude radio frequency oscillation which is a small constant proportion of said output of said amplifier/limiter means to maintain oscillation in said resonant tank circuit.

References Cited in the file of this patent

UNITED STATES PATENTS

| | | |
|---|---|---|
| 2,772,391 | Mackey | Nov. 27, 1956 |
| 2,807,720 | Charles | Sept. 24, 1957 |
| 3,023,358 | Kirchner | Feb. 27, 1962 |

OTHER REFERENCES

Nolle et al.: The Review of Scientific Instruments, vol. 28, No. 11, November 1957, pp. 930 to 932.

Cowen et al.: American Journal of Physics, vol. 26, No. 6, September 1958, pp. 381 to 385.

Andrew: Nuclear Magnetic Resonance, Cambridge University Press, 1955, pp. 49 through 53 relied on.